United States Patent
Jacobs et al.

[11] Patent Number: 6,160,357
[45] Date of Patent: Dec. 12, 2000

[54] BRIDGE COMMUTATOR WITH SEPARATE DRIVE OSCILLATOR FOR ELECTRODELESS LAMPS

[75] Inventors: Ronny A. A. M. Jacobs, Eindhoven, Netherlands; Alex P. M. Van Den Bossche, Herzele, Belgium

[73] Assignee: U.S. Philips Corporation, New York, N.Y.

[21] Appl. No.: 09/412,259

[22] Filed: Oct. 5, 1999

[30] Foreign Application Priority Data

Oct. 6, 1998 [EP] European Pat. Off. .............. 98203354

[51] Int. Cl.$^7$ ................................................... H05B 41/16
[52] U.S. Cl. ..................... 315/248; 315/219; 315/278; 315/244; 315/209 R
[58] Field of Search ..................... 315/248, 344, 315/219, 267, 278, 209 R, 307, 291, 244, DIG. 5

[56] References Cited

U.S. PATENT DOCUMENTS

| 5,003,231 | 3/1991 | Perper | 315/291 |
|---|---|---|---|
| 5,030,889 | 7/1991 | El-Hamamsy et al. | 315/200 R |
| 5,142,201 | 8/1992 | Wessels | 315/209 R |
| 5,200,672 | 4/1993 | Sheynberg et al. | 315/248 |
| 5,892,327 | 4/1999 | Buij et al. | 315/209 R |
| 5,917,722 | 6/1999 | Singh | 363/132 |
| 5,945,783 | 8/1999 | Schultz et al. | 315/219 |
| 5,962,987 | 10/1999 | Statnic | 315/248 |

FOREIGN PATENT DOCUMENTS

| 0442572A1 | 8/1991 | European Pat. Off. . |
|---|---|---|
| 19650110A | 6/1998 | Germany . |
| 9738561A1 | 10/1997 | WIPO . |

*Primary Examiner*—Haissa Philogene
*Attorney, Agent, or Firm*—Bernard Franzblau

[57] ABSTRACT

A circuit arrangement for igniting and operating an electrodeless discharge lamp provided with a half-bridge commutator having two switching elements each having an emitter electrode and a control electrode and a parasitic capacitance in between. Each switching element is alternately switched to a conducting state by means of a resonant control circuit. The resonant control circuit is coupled to an oscillator by way of a transformer. The resonant circuit is provided with a capacitor which forms a part of the oscillator.

13 Claims, 1 Drawing Sheet

BRIDGE COMMUTATOR WITH SEPARATE DRIVE OSCILLATOR FOR ELECTRODELESS LAMPS

BACKGROUND OF THE INVENTION

This invention relates to a circuit arrangement for igniting and operating an electrodeless discharge lamp provided with a bridge commutator having two switching elements each having an emitter electrode (source) and a control electrode (gate) and a parasitic capacitance in between, said switching elements being alternately switched to a conducting state by means of a resonant control circuit which is coupled to an oscillator via a transformer.

A circuit arrangement of the type described in the opening paragraph is known from U.S. Pat. No 5,200,672. The known lamp is suitable for operating a low-pressure mercury discharge lamp. In the known circuit arrangement, the lamp is operated by means of a frequency of 13.56 MHz. Such a high operating frequency requires the use of a crystal oscillator for realizing a sufficiently stable frequency. An electrodeless discharge lamp which is frequently used in practice is operated at an operating frequency between 1 and 3 MHz, which imposes less stringent requirements on the stability of the operating frequency. In the known circuit arrangement, each control electrode is directly connected to a relevant secondary winding of the transformer.

A drawback of the known circuit arrangement is that pulsatory currents during the periods when each switching element is switched to a conducting state lead to distortion of the output voltage of the transformer.

SUMMARY OF THE INVENTION

It is an object of the invention to provide a measure to obviate said drawback.

According to the invention, this object is achieved in that a circuit arrangement of the type described in the opening paragraph is characterized in that the resonant control circuit incorporates capacitor means which form a part of the oscillator.

The circuit arrangement according to the invention appears to have the advantage that no noticeable distortion of the voltage at the output of the transformer occurs under the influence of the pulsatory gate currents of the switching elements, so that the control of the period of conductance of the switching elements is maintained. Moreover, it is sufficient to use an oscillator which, in addition to a switch, comprises only inductive and capacitive elements. The circuit arrangement is preferably dimensioned in such a way that the bridge commutator is operated at a frequency of between 2.5 and 3 MHz.

In a further preferred embodiment of the circuit arrangement according to the invention, each switching element is connected to a relevant part of the resonant control circuit, and each relevant part is provided with a capacitor forming a part of the capacitor means and having a capacitance which is at least 5 times larger than that of the parasitic capacitance between the control electrode and the emitter electrode of the relevant switching element.

BRIEF DESCRIPTION OF THE DRAWING

These and other aspects of the invention will be apparent from and will be elucidated with reference to the embodiments described hereinafter.

In the drawing.

DESCRIPTION OF THE PREFERRED EMBODIMENTS

Figure 1:
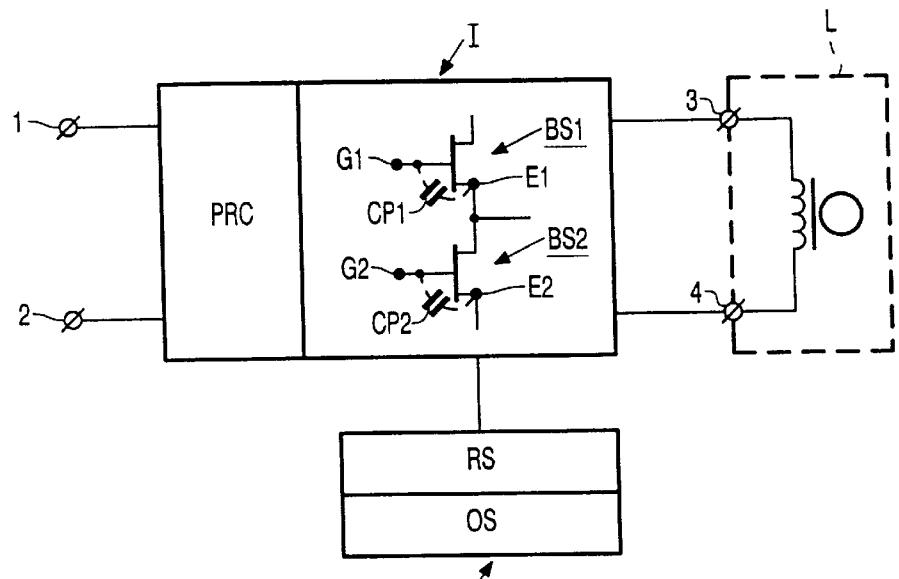
FIG. 1 is a circuit diagram of a circuit arrangement according to the invention.
Figure 2:
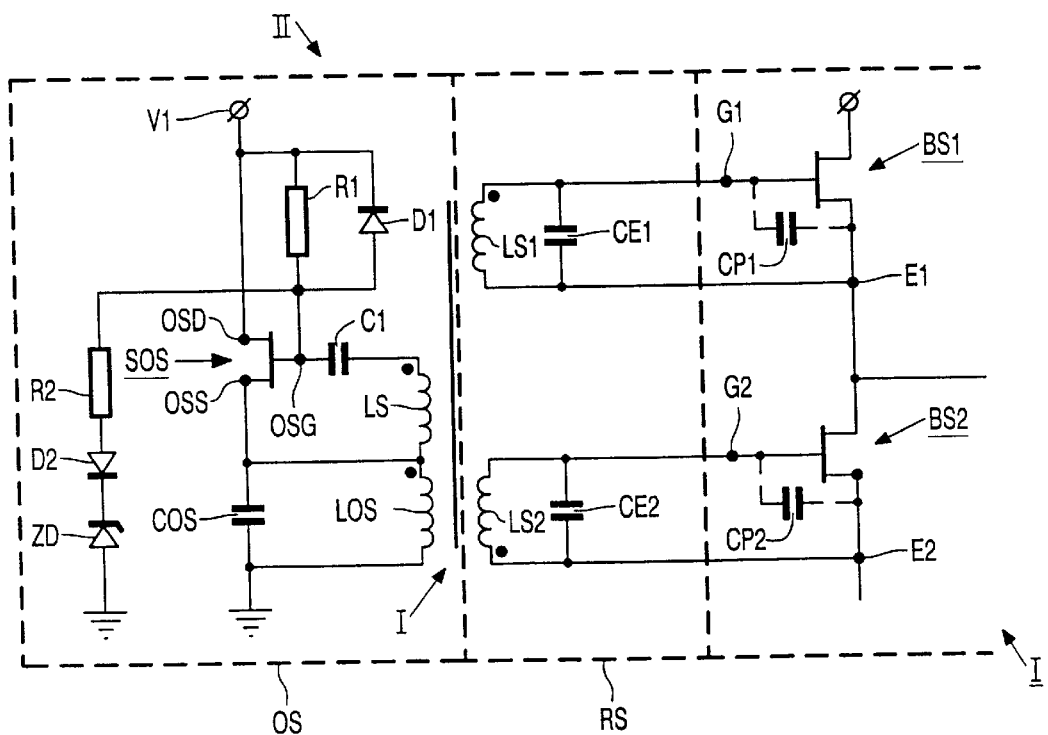
FIG. 2 shows further details of a part of the circuit diagram of FIG. 1.

In FIG. 1, the reference I denotes a switched-mode power supply (SMPS) for igniting and operating an electrodeless discharge lamp L connected to lamp terminals 3, 4. The SMPS, which is suitable to be supplied from, for example, a public mains via connection terminals 1, 2, is provided with a bridge commutator. In the embodiment described, the SMPS comprises a pre-conditioner PRC which converts the AC voltage supplied by the mains into a DC voltage with which the bridge commutator is supplied. The pre-conditioner PRC also ensures that a mains current is obtained which, in a good approximation, is sinusoidal. It is thus possible to realize a high power factor. The bridge commutator comprises two switching elements BS1, BS2 each with respective emitter electrodes E1, E2 and control electrodes G1, G2, respectively. The switching elements are alternately switched to a conducting state. The reference II denotes control means for controlling the bridge commutator. The means II, which are shown in more detail in FIG. 2, comprise an oscillator OS and a resonant control circuit RS. The oscillator OS comprises an oscillating circuit with an oscillator capacitor COS and an oscillator inductance LOS. The oscillator capacitor COS is connected, at one end, to ground and, at the other end, to a source electrode OSS of an oscillator switch SOS which is connected to a power supply voltage V1 by way of a drain electrode OSD.

A gate electrode OSG of the oscillator switch SOS is connected to the oscillating circuit COS, LOS by means of a capacitor C1 and an inductive winding LS. The inductive winding LS and the oscillator inductance LOS constitute a primary winding of a transformer T. The coupling between oscillator OS and the resonant control circuit RS is realized by means of a secondary winding of the transformer T.

The gate electrode OSG of oscillator switch SOS is connected by means of a parallel arrangement of a resistor R1 and a diode D1 to the power supply voltage V1 for starting the oscillator when the power supply voltage is connected. Limitation of the voltage amplitude of the voltage across the primary winding LOS takes place by limiting the voltage at the gate electrode OSG via a circuit comprising a resistor R2, a diode D2 and a zener diode ZD.

The resonant control circuit RS comprises secondary windings LS1, LS2 of transformer T, which are coupled oppositely with respect to each other. Together with a capacitor CE1, winding LS1 constitutes a resonant circuit as the relevant part of the resonant control circuit which is connected between the control electrode G1 and a source electrode E1 of switching element BS1. A parasitic capacitance CP1 is present between the source electrode E1 and the control electrode G1. Analogously, a secondary winding LS2 constitutes, together with a capacitor CE2, a resonant circuit as the relevant part of the resonant control circuit which is arranged between control electrode G2 and source electrode E2 of switching element BS2. Analogously, a parasitic capacitance CP2 is present between source electrode E2 and control electrode G2. The capacitors CE1 and CE2 have a capacitance which is chosen to be such that its value considerably exceeds that of the parasitic capacitances CP1 and CP2 and thus has a predominant influence on the oscillation frequency. The capacitors CE1 and CE2 thus form part of the capacitor means of the resonant control circuit and hence of the oscillator.

In a practical realization of the described embodiment of the circuit arrangement according to the invention, the circuit arrangement is suitable for connection to a power supply mains of 220 V, 50 Hz and for operation of an electrodeless fluorescence lamp with a nominal power of 165 W. The lamp thus operated has a luminous flux of 12 klm.

The switching elements BS1 and BS2 are implemented as FETs, type IRFIBC306, made by International Rectifier. The parasitic capacitance between the source electrode and the control electrode is dependent on the prevailing drain-source voltage and varies between 1300 pF and 660 pF. Capacitors CE1 and CE2 have a capacitance of 6.6 nF each. Transformer T has a ferrite core on which a primary winding consisting of 5 turns as LOS and 2 turns as LS is provided. The oscillator inductance LOS has a value of 370 nH. The mutually oppositely coupled secondary windings LS1 and LS2 consist of 3 turns each.

The oscillator switch SOS is a FET, type BSP122 made by Philips. The oscillator OS also comprises the oscillator capacitor COS having a value of 1.8 nF and capacitor C1 of 1 nF. Capacitor C1 is used for DC decoupling the gate OSG, thereby enabling the oscillator OS to start via resistor R1. In the presence of the power supply voltage V1, C1 is charged via R1. As soon as the voltage across C1 has become sufficiently high, the oscillator switch SOS reaches its linear operating range and constitutes an amplifier having a large gain factor. Due to omnipresent noise, the oscillator OS thus starts oscillating. In the embodiment described, resistor R1 has a value of 4.7 kOhm and the zener diode ZD has a zener voltage of 13 V. In the operating state of the circuit arrangement, the connected lamp is operated at a frequency of 2.65 MHz, realizing a power factor of 0.98.

What is claimed is:

1. A circuit arrangement for igniting and operating an electrodeless discharge lamp comprising a bridge commutator having two switching elements each having an emitter electrode, a control electrode and a parasitic capacitance in between, said switching elements being alternately switched to a conducting state by means of a resonant control circuit which is coupled to an oscillator via a transformer, characterized in that the resonant control circuit incorporates capacitor means which form a part of the oscillator.

2. A circuit arrangement as claimed in claim 1, wherein each switching element is connected to a relevant part of the resonant control circuit, and each relevant part includes a capacitor forming a part of the capacitor means and having a capacitance which is at least 5 times greater than that of the parasitic capacitance between the control electrode and the emitter electrode of the relevant switching element.

3. A circuit arrangement as claimed in claim 1, wherein the bridge commutator is operated at a frequency of between 2.5 and 3 MHz.

4. A circuit for igniting and operating a discharge lamp comprising:

input terminals for connection to a source of supply voltage for the circuit, a bridge commutator including first and second transistor switching elements each having a control electrode, a resonant control circuit coupled to the control electrodes of the first and second transistor switching elements so as to alternately drive the first and second transistor switching elements into a conducting state, and a separate oscillator circuit coupled to the resonant control circuit via a transformer, and wherein the resonant control circuit includes capacitor means which form a part of the separate oscillator circuit.

5. The igniting and operating circuit as claimed in claim 4 wherein:

the separate oscillator circuit includes a transistor coupled to an oscillation circuit including an oscillation capacitor and an oscillation inductance, wherein the oscillation inductance is a part of a primary winding of said transformer.

6. The igniting and operating circuit as claimed in claim 5 wherein;

the separate oscillator circuit further comprises a capacitor coupling a control electrode of the transistor to the oscillation circuit, and a first main electrode of the transistor also is coupled to the oscillation circuit.

7. The igniting and operating circuit as claimed in claim 6 wherein;

the separate oscillator circuit includes a start circuit including a parallel circuit of a diode and an impedance element coupling the transistor control electrode to a source of DC supply voltage.

8. The igniting and operating circuit as claimed in claim 5 wherein;

the separate oscillator circuit comprises a zener diode coupling a control electrode of the transistor to a circuit point of reference voltage thereby to limit the amplitude of a voltage developed across the primary winding of the transformer.

9. The igniting and operating circuit as claimed in claim 5 wherein;

the resonant control circuit includes a secondary winding of said transformer and a further capacitor coupled thereto to form a resonant circuit, and said further capacitor forms a part of the capacitor means.

10. The igniting and operating circuit as claimed in claim 4 wherein each of the first and second transistor switching elements has a parasitic capacitance between a control electrode and a first main electrode thereof, and the capacitance of said capacitor means is at least five times the capacitance of each said parasitic capacitance.

11. The igniting and operating circuit as claimed in claim 5 wherein the separate oscillator circuit includes only inductive and capacitive elements in addition to said transistor.

12. The igniting and operating circuit as claimed in claim 5 wherein;

the resonant control circuit includes first and second capacitors making up said capacitor means and first and second secondary windings of said transformer coupled to the first and second capacitors, respectively, and to respective control electrodes of the first and second transistor switching elements of the bridge commutator.

13. The igniting and operating circuit as claimed in claim 12 wherein the first and second capacitors and the first and second transformer secondary windings form first and second resonant circuits, respectively.

* * * * *